(12) United States Patent
Saso et al.

(10) Patent No.: US 11,124,146 B2
(45) Date of Patent: Sep. 21, 2021

(54) AIRBAG SYSTEM (71) Applicant: HONDA MOTOR CO., LTD., Tokyo (JP)

(72) Inventors: Takashi Saso, Wako (JP); Hiroyuki Ito, Wako (JP); Takayuki Shimizu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 4 days.

(21) Appl. No.: 16/718,263

(22) Filed: Dec. 18, 2019

(65) Prior Publication Data
US 2020/0238941 A1 Jul. 30, 2020

(30) Foreign Application Priority Data
Jan. 29, 2019 (JP) .............................. JP2019-013284

(51) Int. Cl.
| B60R 21/214 | (2011.01) |
| B60R 21/232 | (2011.01) |
| B60R 21/205 | (2011.01) |
| B60R 21/207 | (2006.01) |
| B60R 21/231 | (2011.01) |
| B60R 21/00 | (2006.01) |

(52) U.S. Cl.
CPC .......... B60R 21/214 (2013.01); B60R 21/205 (2013.01); B60R 21/207 (2013.01); B60R 21/232 (2013.01); *B60R 2021/0044* (2013.01); *B60R 2021/0048* (2013.01); *B60R 2021/0058* (2013.01); *B60R 2021/23107* (2013.01)

(58) Field of Classification Search
CPC ... B60R 21/214; B60R 21/232; B60R 21/205; B60R 21/207; B60R 2021/23107; B60R 2021/0044; B60R 2021/0058; B60R 2021/0048; B60R 2021/23146; B60R 21/231; B60R 21/203; B60R 21/23; B60R 21/23138; B60R 21/2334
See application file for complete search history.

(56) References Cited

U.S. PATENT DOCUMENTS

| 7,784,823 B2 * | 8/2010 | Heigl ................. B60R 21/232 280/730.2 |
| 8,985,622 B1 * | 3/2015 | Cannon ................ B60R 21/207 280/730.2 |
| 9,132,798 B2 * | 9/2015 | Yasuoka ............... B60R 21/233 |
| 10,189,432 B2 * | 1/2019 | Matsushita ............. B60R 22/00 |

(Continued)

FOREIGN PATENT DOCUMENTS

| DE | 102005027506 A1 * | 1/2007 | ....... B60R 21/01552 |
| JP | 2017-178148 | 10/2017 | |

*Primary Examiner* — Drew J Brown
(74) *Attorney, Agent, or Firm* — Amin, Turocy & Watson, LLP (57) ABSTRACT An airbag system includes a main airbag device provided in front of an occupant and having a first bag body deployed by being inflated by a gas being supplied during input of an impact, a seat airbag device provided in a seat back of a vehicle seat and having a second bag body deployed by being inflated in an area including a front of a torso of the occupant at behind the first bag body by a gas being supplied during input of an impact, and a screen airbag device having a third bag body deployed by being inflated in an area including behind the first bag body and above the second bag body.

8 Claims, 4 Drawing Sheets (56) References Cited

U.S. PATENT DOCUMENTS

| | | | |
|---|---|---|---|
| 2006/0261579 A1* | 11/2006 | Breed | B60R 21/205 |
| | | | 280/729 |
| 2016/0121839 A1* | 5/2016 | Ko | B60R 21/233 |
| | | | 280/730.1 |
| 2017/0203711 A1* | 7/2017 | Ohno | B60R 21/237 |
| 2019/0016288 A1* | 1/2019 | Schneider | B60R 21/23138 |
| 2019/0023214 A1* | 1/2019 | Kitagawa | B60R 21/237 |
| 2019/0054888 A1* | 2/2019 | Fukawatase | B60R 21/231 |
| 2019/0299912 A1* | 10/2019 | Tanaka | B60R 21/233 |
| 2019/0389420 A1* | 12/2019 | Dry | B60R 21/207 |
| 2020/0122665 A1* | 4/2020 | Shin | B60R 21/233 |
| 2020/0238942 A1* | 7/2020 | Ito | B60R 21/205 |
| 2020/0290552 A1* | 9/2020 | Saso | B60R 21/21 |
| 2020/0339060 A1* | 10/2020 | Wiscombe | B60R 21/23138 |
| 2021/0024027 A1* | 1/2021 | Kanegae | B60R 21/233 |

* cited by examiner

AIRBAG SYSTEM

CROSS-REFERENCE TO RELATED APPLICATION

Priority is claimed on Japanese Patent Application No. 2019-013284, filed Jan. 29, 2019, the content of which is incorporated herein by reference.

BACKGROUND OF THE INVENTION

Field of the Invention

The present invention relates to an airbag system.

Description of Related Art

In the related art, an airbag device having a bag body that is installed in a steering wheel provided in front of a driver's seat or in a console in front of an assistant driver's seat is known. In such an airbag device, the bag body is deployed by being inflated rearward from the steering wheel or the console upon a collision of the vehicle, and an upper body of an occupant is received by the expanded bag body. Here, the body of the occupant having a lumbar region restrained to the vehicle seat by a seat belt is displaced such that the head or the shoulders and the chest are swung forward about the lumbar region, and collides with the bag body deployed by being inflated rearward from the steering wheel or the console. For this reason, it is desired to attenuate the impact when the occupant collides with the bag body.

For example, Japanese Unexamined Patent Application, First Publication No. 2017-178148 discloses a holding airbag in which a bag body is deployed from behind a body of an occupant who is sitting on a vehicle seat, the bag body passes near an armpit of the occupant or a side surface of the upper body and protrudes in front of an upper section of the body, and further, a tip portion of the bag body is deployed so as to be bent or curved upward or upward and rearward. In the holding airbag, the tip portion of the bag body is turned to an upper side of the upper body of the occupant who is sitting on the vehicle seat, and the upper body of the occupant cannot be easily moved in a direction away from the vehicle seat upon collision due to the shoulder, the collarbone or the upper arm of the occupant being held.

SUMMARY OF THE INVENTION

However, in the configuration disclosed in Japanese Unexamined Patent Application, First Publication No. 2017-178148, although the upper body of the occupant is constrained, the head is still displaced forward. For this reason, it is desired to more effectively attenuate the impact when the head of the occupant collides with the bag body.

An aspect of the present invention is directed to providing an airbag system capable of attenuating an impact applied to an occupant using a bag body expanded upon collision.

(1) An airbag system according to an aspect of the present invention includes a first airbag device that is provided in front of an occupant who is sitting on a vehicle seat and that includes a first bag body that is configured to be deployed by being inflated by a gas being supplied during input of an impact; a second airbag device that is provided in a seat back of the vehicle seat and that includes a second bag body which is configured to be deployed by being inflated in an area including a front of a torso of the occupant who is sitting on the vehicle seat at behind the first bag body by a gas being supplied during input of an impact; and a third airbag device that includes a third bag body which is configured to be deployed by being inflated in an area including behind the first bag body and above the second bag body by a gas being supplied during input of an impact.

(2) In the aspect of the above-mentioned (1), the third bag body may be formed in a plane shape that crosses a vehicle forward/rearward direction.

(3) In the aspect of the above-mentioned (1) or (2), the third bag body may be configured to be deployed by being inflated in a direction that crosses a vehicle forward/rearward direction.

(4) In the aspect of the above-mentioned (3), the third bag body may be configured to be deployed by being inflated downward from a ceiling section of the vehicle.

(5) In the aspect of any one of the above-mentioned (1) to (4), the third bag body may be configured to be deployed by being inflated between the first bag body and the second bag body.

(6) In the aspect of any one of the above-mentioned (1) to (5), the airbag system may further include a controller configured to deploy and inflate the third bag body, the second bag body and the first bag body such that the third bag body, the second bag body and the first bag body are deployed by being inflated in this sequence.

(7) In the aspect of any one of the above-mentioned (1) to (6), the second bag body may include a pair of forward extension sections extending forward from both sides of the seat back in a widthwise direction; and a front bag that is provided to be continuous with the forward extension sections, that is configured to be deployed in front of the occupant who is sitting on the vehicle seat, and that is configured to abut an upper section of the torso of the occupant.

(8) In the aspect of the above-mentioned (7), the pair of forward extension sections may include a pair of side bags that is configured to be deployed toward both sides of the torso of the occupant in the widthwise direction, respectively, that is configured to abut a side surface of the torso and that is connected to the front bag; and a pair of upper bags that is configured to be deployed above the torso of the occupant and that is configured to abut an upper surface of a shoulder of the occupant.

According to the aspect of the above-mentioned (1), the second bag body is deployed by being inflated in the area including a front of the torso of the occupant. Accordingly, forward displacement of the torso of the occupant is minimized by the second bag body. In addition, the third bag body is deployed by being inflated in a portion including an upper side of the second bag body. Accordingly, even when the head of the occupant is displaced forward above the second bag body, the head of the occupant can be received by the third bag body. That is, a displacement of the torso or the head of the occupant so as to be swung forward about the lumbar region restrained by a seat belt can be received by the second bag body and the third bag body, and an impact applied by the occupant colliding with the first bag body can be minimized.

In the aspect of the above-mentioned (2), since the third bag body is formed in a plane shape crossing with respect to the vehicle forward/rearward direction, the third bag body is easily deployed over a large area by being inflated in front of the head of the occupant. In addition, a large deployed surface of the third bag body is easily deformed forward (in an out-of-plane direction) by contact with the head. Accordingly, an impact applied to the head of the occupant can be minimized.

According to the aspect of the above-mentioned (3), the third bag body is deployed by being inflated in a direction crossing with respect to the vehicle forward/rearward direction. That is, inflation and deployment of the third bag body in a displacement direction (the vehicle forward/rearward direction) of the head is minimized. Accordingly, an impact applied from the third bag body to the head of the occupant displaced forward upon a collision can be minimized.

According to the aspect of the above-mentioned (4), the third bag body is deployed by being inflated downward from a ceiling section of the vehicle. Accordingly, the third bag body can be accommodated in the ceiling section, the third bag body can be deployed by being inflated downward upon a collision, and an impact applied to the head of the occupant displaced forward can be minimized.

According to the aspect of the above-mentioned (5), the third bag body is deployed by being inflated between the first bag body and the second bag body. Accordingly, even when the head of the occupant is displaced forward at above the second bag body, the head of the occupant can be reliably received by the third bag body.

According to the aspect of the above-mentioned (6), the third bag body, the second bag body and the first bag body are deployed by being inflated by the controller in sequence of these. Accordingly, before the first bag body is deployed by being inflated, the second bag body and the third bag body are deployed by being inflated, and a direct collision of the occupant with the inflated and deployed first bag body can be prevented.

According to the aspect of the above-mentioned (7), the front bags provided to be continuous with the pair of forward extension sections extending from both sides of the seat back in the widthwise direction toward the front of the vehicle are deployed toward the occupant who is sitting on the vehicle seat in the front of the vehicle. Accordingly, a forward moving amount of the torso of the occupant can be minimized. In addition, the front bags abut the upper section of the front surface of the torso of the occupant. The upper section of the torso of the occupant, for example, the collarbones or a portion to several rib bones from the uppermost rib bone has a higher resistance with respect to a load applied from in front compared to the portion therebelow. The front bags abut the upper section of the front surface of the torso having a high resistance with respect to a load, and, with respect to the lower section of the front surface of the torso having a low resistance to the load, the front lower bag sections weakly abut or the front bags do not abut at all. Accordingly, even when the torso of the occupant is displaced so as to be swung forward to collide with the bag body during collision, an impact received by the occupant can be attenuated.

According to the aspect of the above-mentioned (8), since the forward extension sections include the side bags and the upper bags, the forward extension sections can cover the upper sections of the side portions of the torso and the shoulders of the occupant, and an impact received by the occupant can be attenuated.

DETAILED DESCRIPTION OF THE INVENTION

Hereinafter, embodiments of the present invention will be described with reference to the accompanying drawings. Further, in the drawings used in the following description, an arrow FR indicates a forward direction with respect to a vehicle, an arrow UP indicates an upward direction with respect to the vehicle, and an arrow LH indicates a leftward direction with respect to the vehicle.

Figure 1:
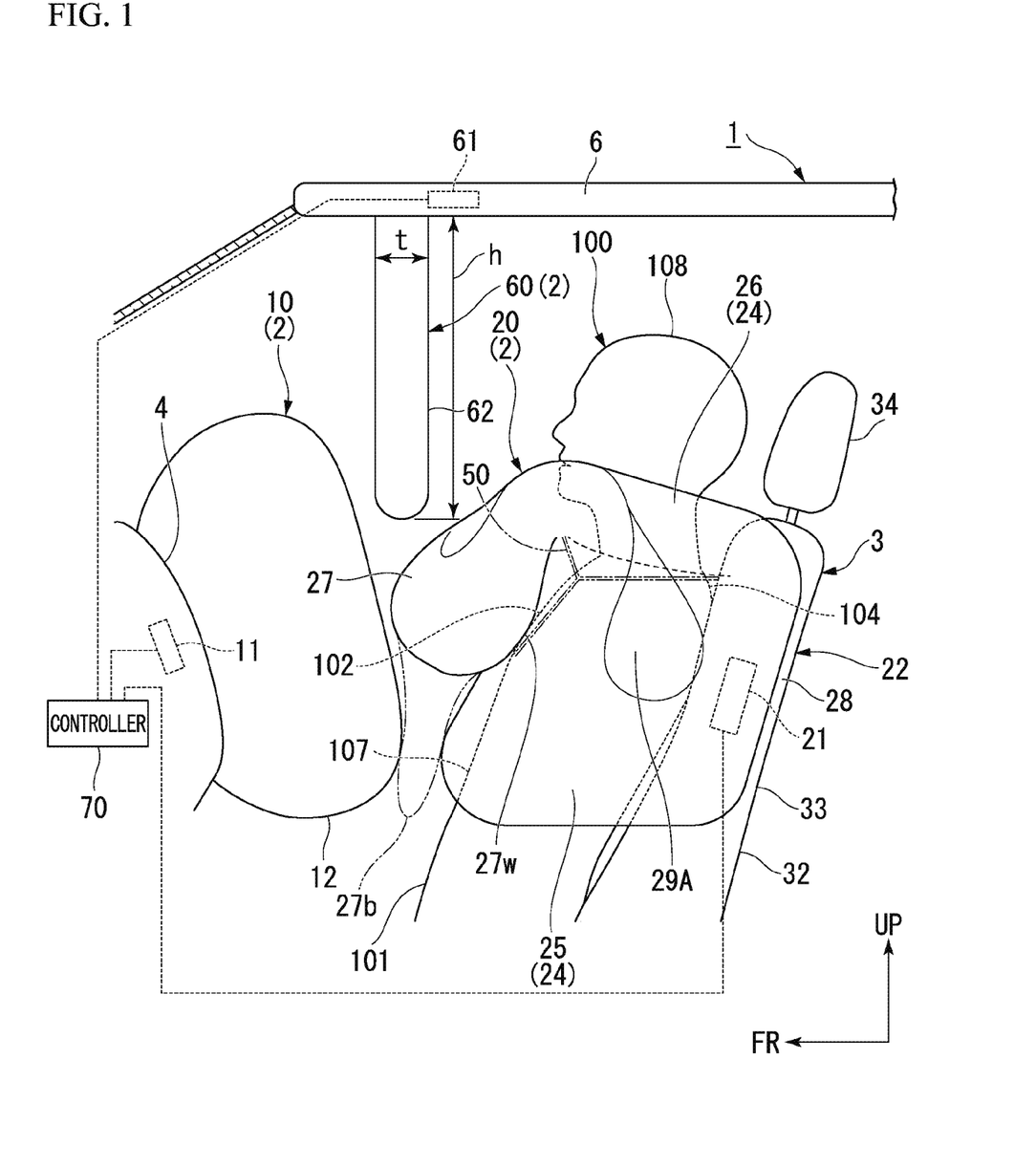
FIG. 1 is a side view showing a part of a vehicle in which an airbag system according to an embodiment of the present invention is mounted.

FIG. 1 is a side view showing a part of a vehicle in which an airbag system to which an embodiment of the present invention is applied is mounted.

As shown in FIG. 1, a vehicle 1 includes an airbag system 2 provided in a passenger compartment. The airbag system 2 includes a main airbag device (a first airbag device) 10 provided in a steering wheel or a console 4, a seat airbag device (a second airbag device) 20 provided in a vehicle seat 3, a screen airbag device (a third airbag device) 60 provided in a ceiling section 6 of a vehicle body, and a controller 70 configured to control the airbag devices 10, 20 and 60.

The steering wheel and the console 4 are provided in a front side of the vehicle 1 (in the front of the vehicle) with respect to the vehicle seat 3. The main airbag device 10 includes an inflator 11 and a first bag body 12.

The inflator 11 generates a high pressure gas during input of an impact to the vehicle. The inflator 11 is installed in the steering wheel or the console 4.

The first bag body 12 is accommodated in the steering wheel or the console 4, for example, while being folded or wound, and deployed by being inflated toward a rear side of the vehicle (behind the vehicle) from the steering wheel or the console 4 by receiving supply of a gas from the inflator 11.

Figure 2:
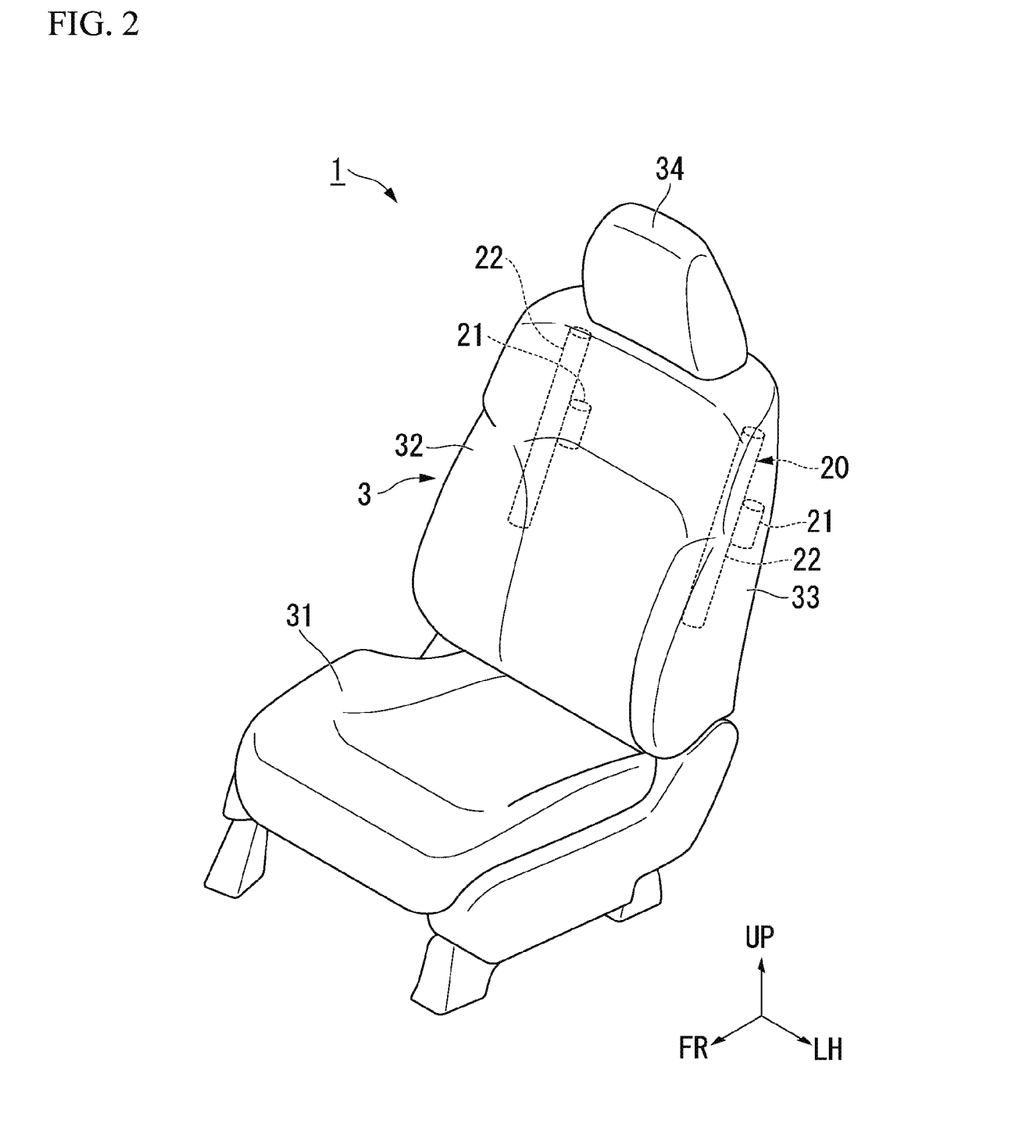
FIG. 2 is a perspective view showing a vehicle seat including a second airbag device of the airbag system.

FIG. 2 is a perspective view showing a vehicle seat including a second airbag device of the airbag system.

As shown in FIG. 2, the vehicle seat 3 on which the seat airbag device 20 is mounted is, for example, a seat of a driver's seat, an assistant driver's seat, or the like. The vehicle seat 3 includes a seat cushion 31 configured to support the buttocks of the occupant, and a seat back 32 connected to a rear end portion of the seat cushion 31 and configured to support an upper body (the torso, the neck and the head) of the occupant.

The seat cushion 31 includes a frame that forms a skeleton of the seat cushion 31, a pad member formed of, for example, urethane foam or the like and mounted on the frame, and a cover formed of, for example, synthetic fibers, leather, or the like, and configured to cover the frame and the pad member (none is shown). The seat back 32 is tiltably connected to a rear end portion of the seat cushion 31. The seat back 32 includes a seat back main body 33 configured to support, for example, the lumbar region and the back section of the occupant, and a headrest 34 attached to an upper end portion of the seat back main body 33 and configured to support, for example, the head of the occupant. Like the seat cushion 31, the seat back 32 is constituted by a frame, a pad member and a cover. Further, the seat back main body 33 and the headrest 34 may be formed integrally with each other.

The seat airbag device 20 is installed in the seat back 32. In the embodiment, the seat airbag device 20 is installed in the seat back main body 33. The seat airbag device 20 restricts an upper section of an upper body of the occupant during an operation. The seat airbag device 20 includes an inflator 21 and a pair of second bag bodies 22.

The inflator 21 generates a high pressure gas during input of an impact to the vehicle. The inflator 21 is attached to a frame that forms the seat back 32.

Figure 3:
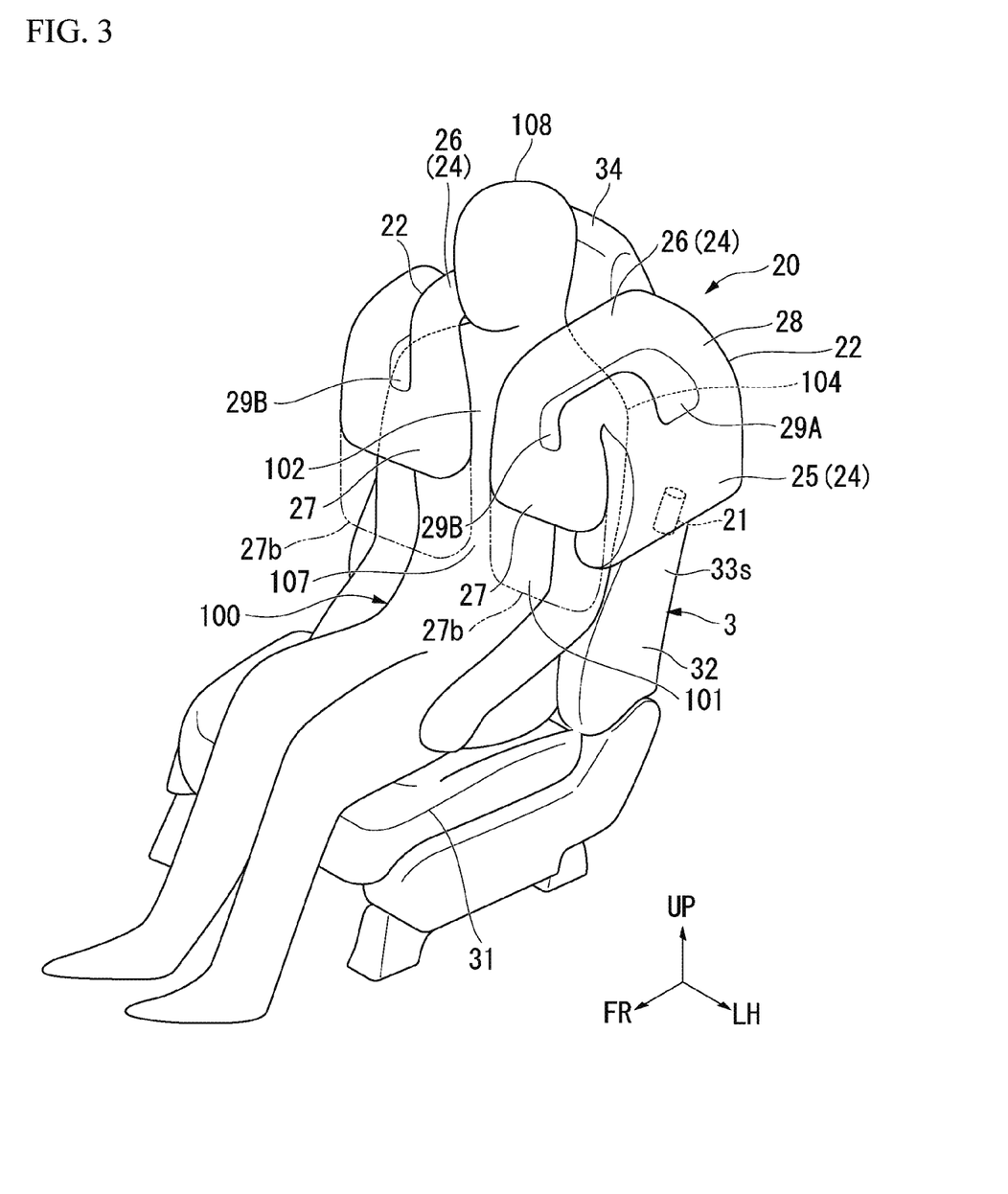
FIG. 3 is a view showing a state in which the second airbag device is deployed, which is a perspective view of the vehicle seat in which the second airbag device is mounted.
Figure 4:
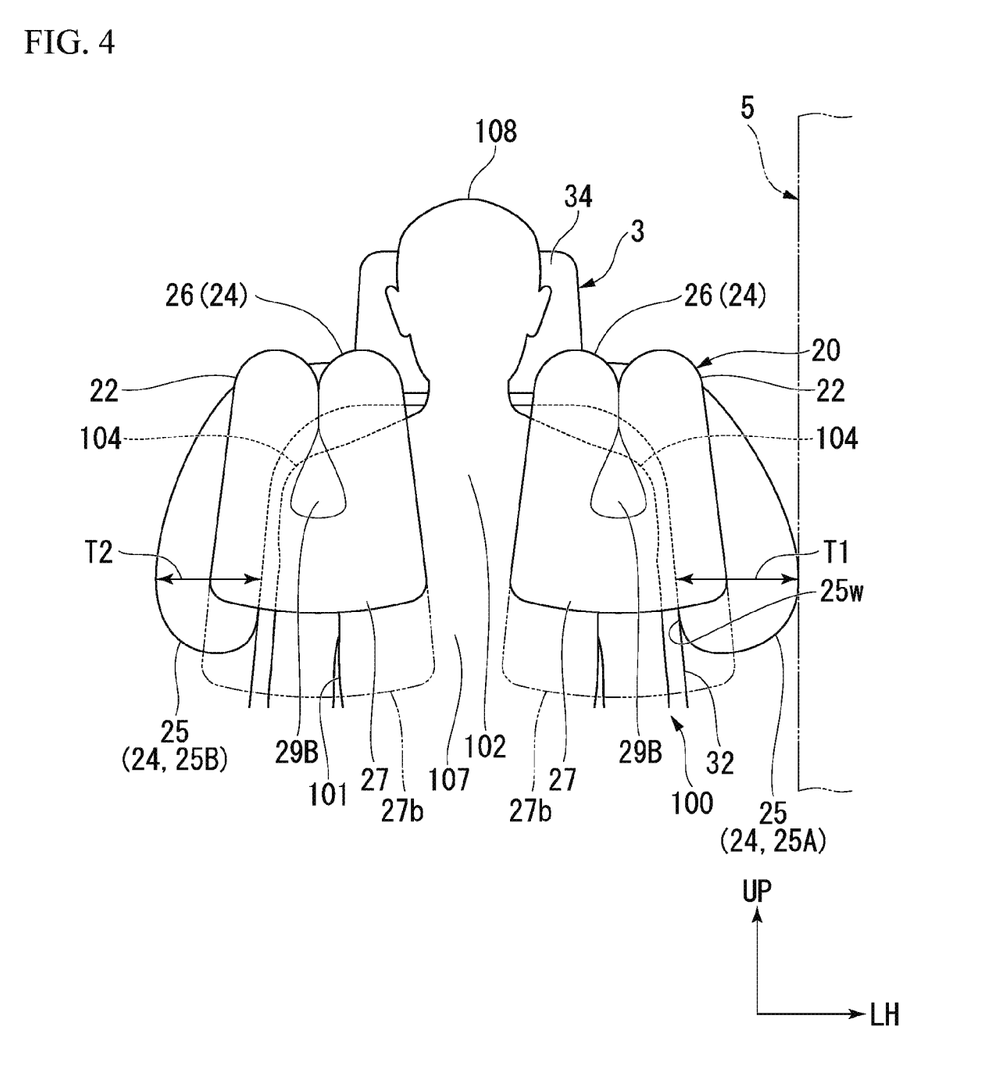
FIG. 4 is a view showing a state in which the second airbag device is deployed, which is a view showing the vehicle seat in which the second airbag device is mounted when seen from in front of the vehicle.

FIG. 3 is a view showing a state in which the second airbag device is deployed, which is a perspective view of the vehicle seat in which the second airbag device is mounted. FIG. 4 is a view showing a state in which the second airbag device is deployed, which is a view of the vehicle seat in which the second airbag device is mounted when seen from in front of the vehicle.

As shown in FIG. 1, FIG. 3 and FIG. 4, the pair of second bag bodies 22 are accommodated in the seat back 32, for example, while being folded or wound, and deployed by being inflated from the seat back 32 by receiving supply of a gas from the inflator 21. The pair of second bag bodies 22 are attached to the frame that forms the seat back 32. Each of the second bag bodies 22 is formed in a bag shape with one sheet of base fabric, or a plurality of sheets of base fabric that are sewed to each other. In the following description related to the second bag bodies 22, a state in which deployment of the second bag bodies 22 is terminated (a state shown in FIG. 1, FIG. 3 and FIG. 4) will be described unless the context clearly indicates otherwise.

The pair of second bag bodies 22 are disposed to cross the front of the torso of the occupant from sides of the seat back main body 33, respectively. The second bag bodies 22 are deployed by breaking seams or the like of the cover from side surfaces 33s of the seat back main body 33. The pair of second bag bodies 22 are deployed by being inflated in a region including a side in front of the torso 101 of the occupant 100.

Each of the pair of second bag bodies 22 includes a forward extension section 24 and a front bag 27.

The forward extension sections 24 extend toward the front of the vehicle 1 from the sides of the seat back 32 in the widthwise direction. In the embodiment, each of the forward extension sections 24 includes a side bag 25 and an upper bag 26.

The side bags 25 extend forward from the sides of the seat back 32 in the widthwise direction by sides (side surfaces) of the torso 101 of the occupant 100. The side bags 25 are deployed in a tubular shape extending in the forward/rearward direction, and cover the shoulders 104 and the upper sections of arms of the occupant 100 from sides thereof.

The upper bags 26 are provided to be continuous with rear end portions of the side bags 25 via articulated sections 28 extending upward. The upper bags 26 extend forward from the articulated sections 28, and are deployed to cover upper surfaces of the shoulders 104 above the torso 101 of the occupant 100.

Here, as shown in FIG. 4, in the pair of second bag bodies 22, a thickness T1 of a side bag 25A provided on a side of a door 5 of the vehicle 1 in the leftward/rightward direction (the widthwise direction of the vehicle 1) is larger than a thickness T2 of a side bag 25B on a side opposite to the side of the door 5.

As shown in FIG. 1, FIG. 3 and FIG. 4, the front bags 27 are provided to be continuous with the forward extension sections 24. In the embodiment, the front bags 27 are provided to be continuous with front end portions of the side bags 25 and front end portions of the upper bags 26. The front bags 27 are deployed in front of the occupant 100 who is sitting on the vehicle seat 3, and abut only an upper section 102 of a front surface of the torso 101 of the occupant 100. Specifically, the front bags 27 are provided to abut collarbones and a plurality of rib bones of the torso 101 (for example, the second rib bones from the top) from above. Lower sections of the front bags 27 are terminated at a height of, for example, the second rib bone from the uppermost rib bone, and do not abut an area below the third rib bone from the uppermost rib bone (a lower section 107 of a front surface of the torso 101). Accordingly, a relative strength of an occupant restricting force is applied by the front bags 27 in the upward/downward direction.

As shown by two-dot dashed lines in FIG. 1, FIG. 3 and FIG. 4, the front bags 27 may include front lower backs 27b that abut with respect to an area below the third rib bone (the lower section 107) of the uppermost rib bone with a smaller force than when abutting the upper section 102. The front lower backs 27b are provided with, for example, holes, notches, fragile sections, and the like, so as to have weak abutting forces. Accordingly, a relative strength occupant restricting force is applied by the front bags 27 in the upward/downward direction.

As shown in FIG. 1, the front bags 27 are provided to be deployed by being inflated between the first bag body 12 provided in the steering wheel or the console 4 and the torso 101 of the occupant 100.

Beltlike tethers 50 are provided in the second bag bodies 22 such that the side bags 25, the upper bags 26 and the front bags 27 are deployed along the upper section 102 of the front surface of the torso 101 of the occupant 100 and the upper sections of the side surfaces of the torso 101.

Non-expansion sections 29A and 29B obtained by sewing the base fabrics facing the bag bodies thereof and configured not to be expanded during deployment are formed on the side bags 25 and the front bags 27. The side bags 25 are expanded while forming curved surfaces 25w (see FIG. 4) abutting upper sections of the arms of the occupant 100 by forming the non-expansion sections 29A. The front bags 27 are expanded while forming curved surfaces 27w (see FIG. 1) abutting the upper section 102 of the front surface of the torso 101 by forming the non-expansion sections 29B.

In addition, the second bag bodies 22 have the side bags 25, the upper bags 26 and the front bags 27 that are continuously provided on outer circumferential sides of the non-expansion sections 29A and 29B.

The inflator 21 supplies a gas into the second bag bodies 22 in the vicinity of the rear end portions of the side bags 25. The pair of second bag bodies 22 are deployed by being inflated in the sequence of the side bags 25, the upper bags 26 and the front bags 27 when the gas is supplied from the inflator 21.

As shown in FIG. 1, the screen airbag device 60 includes an inflator 61 and a third bag body 62.

The inflator 61 generates a high pressure gas during input of an impact to the vehicle. The inflator 61 is installed in the ceiling section 6 of the vehicle 1.

The third bag body 62 is accommodated in the ceiling section 6, for example, while being folded or wound up. The third bag body 62 is deployed by being inflated in a direction crossing the forward/rearward direction by receiving supply of a gas from the inflator 61. Specifically, the third bag body 62 is deployed by being inflated from the ceiling section 6 toward the inside of the passenger compartment (downward). The third bag body 62 is deployed by being inflated in an area behind the first bag body 12 and above the second bag bodies 22. The third bag body 62 is deployed by being inflated between the first bag body 12 and the second bag bodies 22.

The third bag body 62 is formed in a screen shape (a film shape) so as to be disposed on a plane crossing (perpendicular to) the forward/rearward direction of the vehicle 1. That is, the third bag body 62 is formed in a flat shape having a thickness dimension t in the forward/rearward direction that is smaller than a height dimension h in an upward/downward direction and a width dimension in a leftward/rightward direction (a dimension in a direction perpendicular to the surface in FIG. 1).

The controller 70 controls inflation and deployment timings of the first bag body 12 of the main airbag device 10, the second bag bodies 22 of the seat airbag device 20, and the third bag body 62 of the screen airbag device 60. In the embodiment, the controller 70 controls the first bag body 12, the second bag bodies 22 and the third bag body 62 to be sequentially deployed by being inflated in sequence of the third bag body 62, the second bag bodies 22 and the first bag body 12.

For example, the controller 70 may change the timings at which gases are supplied from the respective inflators 11, 21 and 61 on the basis of a preset timer or the like when a sensor (not shown) provided in the vehicle 1 detects a collision of the vehicle 1.

Hereinafter, an operation of the airbag system 2 will be described.

When an impact is input to the vehicle, the inflator 61 of the screen airbag device 60, the inflators 21 of the seat airbag device 20, and the inflator 11 of the main airbag device 10 sequentially generate high pressure gases. When a gas is generated from the inflator 61, the third bag body 62 of the screen airbag device 60 is deployed by being inflated by receiving supply of the gas. When a gas is generated from the inflator 21, the second bag bodies 22 of the seat airbag device 20 are deployed by being inflated by receiving supply of the gas. When a gas is generated from the inflator 11, the first bag body 12 of the main airbag device 10 is deployed by being inflated by receiving supply of the gas.

Here, the controller 70 controls the third bag body 62 of the screen airbag device 60, the second bag bodies 22 of the seat airbag device 20 and the first bag body 12 of the main airbag device 10 such that they are deployed by being inflated in this sequence. That is, the second bag bodies 22 and the third bag body 62 are deployed by being inflated before the first bag body 12 is deployed by being inflated. Accordingly, a collision of the occupant 100 with respect to the inflated and deployed first bag body 12 is mitigated. In addition, since the third bag body 62 is deployed by being inflated ahead of the second bag bodies 22, inflation and deployment of the third bag body 62 are unlikely to be blocked by the second bag bodies 22.

In addition, when the second bag bodies 22 are deployed by being inflated, if a gas is generated from the inflator 21, the side bags 25 are first deployed by being inflated by receiving supply of the gas. When the side bags 25 are have been partially deployed by being inflated, the gas is supplied from the rear end portions of the side bags 25 to the upper bags 26 through the articulated sections 28, and the upper bags 26 are deployed by being inflated.

After that, the gas is supplied to the front bags 27 from the front end portions of the side bags 25 and the front end portions of the upper bags 26. Accordingly, the front bags 27 are deployed by being inflated in front of the upper section 102 of the torso 101 of the occupant 100. A deployment shape of the front bags 27 is a shape of covering the upper section 102 of the torso 101 of the occupant 100 from in front using a tension of the tether 50, and maintains a restricting force of the body of the occupant 100. The front bags 27 are interposed between the upper section 102 of the torso 101 and the first bag body 12 of the main airbag device 10 deployed by being inflated from the steering wheel or the console 4.

Accordingly, an operation of the airbag system 2 is terminated.

As described above, in the embodiment, the second bag bodies 22 are deployed by being inflated in an area including a front side of the torso 101 of the occupant 100. Accordingly, forward displacement of the torso 101 of the occupant 100 is suppressed by the second bag bodies 22. In addition, the third bag body 62 is deployed by being inflated in an area including an upper side of the second bag bodies 22. Accordingly, even when the head 108 of the occupant 100 is displaced forward above the second bag bodies 22, the head 108 of the occupant 100 can be received by the third bag body 62. That is, a displacement of the torso 101 or the head 108 of the occupant 100 so as to be swung forward about the lumbar region restrained by a seat belt can be received by the second bag bodies 22 and the third bag body 62 at early timing. Accordingly, an impact applied by the occupant 100 colliding with the first bag body 12 can be minimized.

In addition, even when the head 108 of the occupant 100 is displaced forward because the third bag body 62 is deployed by being inflated behind the first bag body 12, direct collision of the head 108 with the first bag body 12 which is deployed by being inflated rearward can be prevented. This can also minimize the impact applied due to collision of the occupant 100 with the first bag body 12.

In addition, since the third bag body 62 is formed in a plane shape crossing with respect to a vehicle forward/rearward direction, the third bag body 62 is easily deployed over a large area by being inflated in front of the head 108 of the occupant 100. In addition, a large deployed surface of the third bag body 62 is easily deformed forward (in an out-of-plane direction) due to a contact with the head 108. Accordingly, an impact applied to the head 108 of the occupant 100 can be effectively minimized.

In addition, the third bag body 62 is deployed by being inflated in a direction crossing with respect to the vehicle forward/rearward direction. Accordingly, inflation and deployment of the third bag body 62 with respect to the head 108 of the occupant 100 which is displaced forward upon collision in a displacement direction (the forward/rearward direction) of the head 108 are minimized That is, the impact applied to the occupant 100 can be effectively minimized in comparison with the case in which the head 108 of the occupant 100 displaced forward directly collides with first bag body 12 deployed by being inflated rearward.

In addition, the third bag body 62 is deployed by being inflated downward from the ceiling section 6 of the vehicle 1. Accordingly, the third bag body 62 can be accommodated in the ceiling section 6, and the third bag body 62 is deployed by being inflated downward upon collision. Accordingly, even when the head 108 of the occupant 100 is displaced forward, direct collision of the head 108 with the first bag body 12 deployed by being inflated rearward can be avoided, and an impact applied to the occupant 100 can be effectively minimized.

In addition, the third bag body 62 is deployed by being inflated between the first bag body 12 and the second bag bodies 22. Accordingly, even when the head 108 of the occupant 100 is displaced forward at above the second bag bodies 22, the head 108 of the occupant 100 can be reliably received by the third bag body 62.

In addition, the third bag body 62, the second bag bodies 22 and the first bag body 12 are deployed by being inflated by the controller 70 in sequence of these. Accordingly, before the first bag body 12 is deployed by being inflated, the second bag bodies 22 and the third bag body 62 are deployed by being inflated, and directed collision of the occupant 100 with the inflated and deployed first bag body 12 can be prevented.

In addition, the front bags 27 are provided to be continuous with the pair of forward extension sections 24 extending from both sides of the seat back 32 in the widthwise direction toward the front of the vehicle, and the front bags 27 are deployed in front of the occupant 100 who is sitting on the vehicle seat 3.

Accordingly, a movement amount of the torso 101 of the occupant 100 toward the front of the vehicle can be minimized. In addition, the front bags 27 abut the upper section 102 of the front surface of the torso 101 of the occupant 100. The upper section 102 of the torso 101 of the occupant 100, for example, the collarbones or a portion to several rib bones from the uppermost rib bone has a higher resistance with respect to a load applied from in front compared to the portion therebelow. The front bags 27 abut the upper section 102 of the front surface of the torso 101 having a high resistance with respect to the load, and, with respect to the lower section 107 of the front surface of the torso 101 having a low resistance to the load, the front lower bag 27b weakly abut or the front bags 27 do not abut at all. Accordingly, application of the impact to the lower section 107 below the upper section 102 of the torso 101, which having a low resistance with respect to a load applied from the front, can be minimized. Accordingly, even when the torso 101 of the occupant 100 is displaced so as to be swung forward to collide with the second bag bodies 22 during collision, the impact received by the occupant 100 can be attenuated.

In addition, the forward extension sections 24 include the side bags 25 and the upper bags 26. Accordingly, the forward extension sections 24 cover the upper sections 102 of the side portions 103 of the torso 101 and the shoulders 104 of the occupant 100, and an impact received by the occupant 100 can be attenuated.

Further, the present invention is not limited to the above-mentioned embodiment described with reference to the accompanying drawings, and various variants may be conceived without departing from the technical scope of the present invention.

For example, in the embodiment, while the third bag body 62 of the screen airbag device 60 is deployed by being inflated downward from the ceiling section 6, there is no limitation thereto. For example, the third bag body 62 may be deployed by being inflated from the door 5 of the vehicle 1 in the leftward/rightward direction. In addition, the third bag body 62 may be provided, for example, continuously with the second bag bodies 22 and may be deployed by being inflated from the second bag bodies 22.

In addition, in the embodiment, the configuration of the second bag bodies 22 of the seat airbag device 20 may be appropriately modified. For example, while the side bags 25 and the upper bags 26 may be provided as the forward extension sections 24, only one of these may be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An airbag system comprising:
    a first airbag device that is provided in front of an occupant who is sitting on a vehicle seat and that includes a first bag body that is configured to be deployed by being inflated by a gas being supplied during input of an impact;
    a second airbag device that is provided in a seat back of the vehicle seat and that includes a second bag body which is configured to be deployed by being inflated in an area including a front of a torso of the occupant who is sitting on the vehicle seat at behind the first bag body by a gas being supplied during input of an impact;
    a third airbag device that includes a third bag body which is configured to be deployed by being inflated in an area including behind the first bag body and above the second bag body by a gas being supplied during input of an impact; and
    a controller configured to deploy and inflate the first bag body, the second bag body and the third bag body,
    wherein the second bag body includes a side bag that is deployed at outside of the torso of the occupant in a widthwise direction and an upper bag that continuously extends upward from a rear end portion of the side bag, and
    the third bag body, the second bag body and the first bag body are capable of being deployed by being inflated in this sequence, and the side bag and the upper bag are capable of being deployed by being inflated in this sequence when the second bag body is deployed.

2. The airbag system according to claim 1, wherein the third bag body is formed in a plane shape that crosses a vehicle forward/rearward direction.

3. The airbag system according to claim 1, wherein the third bag body is configured to be deployed by being inflated in a direction that crosses a vehicle forward/rearward direction.

4. The airbag system according to claim 3, wherein the third bag body is configured to be deployed by being inflated downward from a ceiling section of the vehicle.

5. The airbag system according to claim 1, wherein the third bag body is configured to be deployed by being inflated between the first bag body and the second bag body.

6. The airbag system according to claim 1, wherein the second bag body comprises:
    a pair of forward extension sections extending forward from both sides of the seat back in a widthwise direction; and
    a front bag that is provided to be continuous with the forward extension sections, that is configured to be deployed in front of the occupant who is sitting on the vehicle seat, and that is configured to abut an upper section of the torso of the occupant.

7. The airbag system according to claim 6, wherein the side bag and the upper bag are provided at the pair of forward extension sections, the side bag is configured to abut a side surface of the torso; and the upper bag is configured to abut an upper surface of a shoulder of the occupant.

8. An airbag system comprising:
a first airbag device that is provided in front of an occupant who is sitting on a vehicle seat and that includes a first bag body that is configured to be deployed by being inflated by a gas being supplied during input of an impact;
a second airbag device that is provided in a seat back of the vehicle seat and that includes a second bag body which is configured to be deployed by being inflated in an area including a front of a torso of the occupant who is sitting on the vehicle seat at behind the first bag body by a gas being supplied during input of an impact; and
a third airbag device that includes a third bag body which is configured to be deployed by being inflated in an area including behind the first bag body and above the second bag body by a gas being supplied during input of an impact,
wherein the second bag body includes a side bag that is deployed at outside of the torso of the occupant in a widthwise direction and an upper bag that continuously extends upward from a rear end portion of the side bag, and
the upper bag is configured to abut an upper surface of a shoulder of the occupant due to a tether disposed inside the second bag body.

* * * * *